Jan. 7, 1930. P. V. HUNTER 1,742,354
ELECTRIC CABLE OR ATTACHMENT FOR USE IN CONNECTION THEREWITH
Filed July 21, 1928

Inventor:
Philip Vassar Hunter

Patented Jan. 7, 1930

1,742,354

UNITED STATES PATENT OFFICE

PHILIP VASSAR HUNTER, OF LONDON, ENGLAND

ELECTRIC CABLE OR ATTACHMENT FOR USE IN CONNECTION THEREWITH

Application filed July 21, 1928, Serial No. 294,562, and in Great Britain September 3, 1927.

This invention relates to electric cables and in particular of the kind intended to be laid in ducts or conduits. Such conduits or ducts are usually of earthenware, concrete or similar more or less insulating material and when the cable is drawn in at ground temperature it lies practically straight on the bottom of the duct if no provision is made for the expansion of the cable under load.

According to this invention the cable itself is provided at suitable intervals with girdles or enlargements so that it is normally clear of the conduit and can sag when it expands under continuous maximum load, the girdles or enlargements being preferably so proportioned and spaced that when the cable thus sags it just rests on the floor of the conduit. These girdles or enlargements may form an integral part of the cable, i. e. they may be incorporated in the sheathing or covering of the cable during its manufacture or they may be in the form of detachable members which are secured to the cable at the requisite intervals when it is being laid or drawn into the conduits.

In one arrangement according to this invention the girdles may take the form of substantially spherical enlargements on the wall or sheath of the cable formed, say of lead or other suitable material, or such enlargements may be interposed between the lead sheathing and the cable proper and subsequently coated with the lead during the sheathing process so as to form a series of enlargements at intervals in the length of the cable serving to support the cable just clear of the floor or base of the conduit.

Alternatively, the girdles may comprise separate members of metal or other suitable material which can be applied by being soldered or sweated to the outer wall of the cable in the case of lead sheathed cables or which may be secured in place at the requisite intervals by means of some friction device, clamp or the like, in most cases the girdles being longitudinally divided to facilitate their application to the cable.

Figure 1:
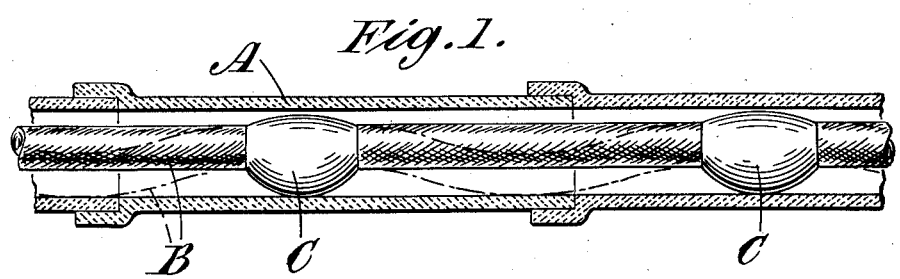
Figure 2:
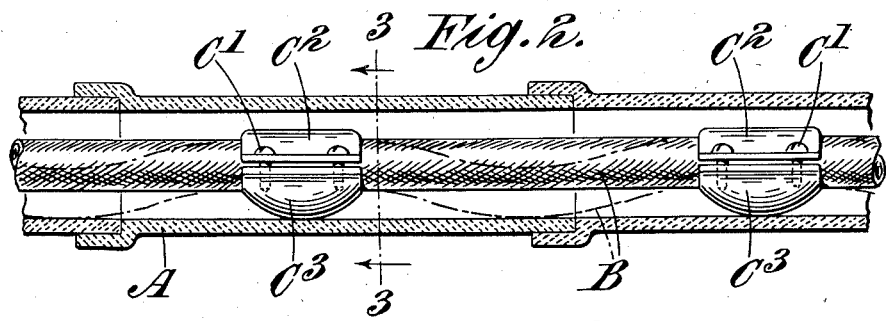
Figure 3:
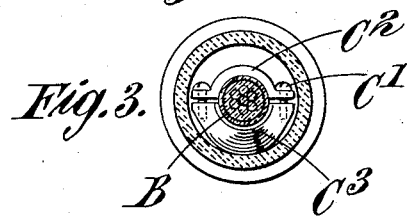
Figure 4:
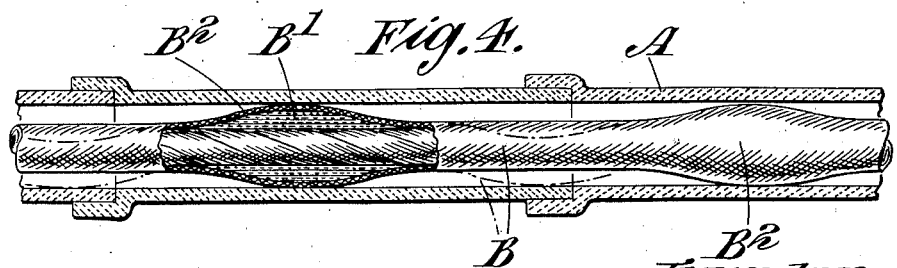

In the accompanying drawings,

Figure 1 is a longitudinal section of a conduit containing an electric cable made with girdles or enlargements of one construction according to this invention, Figure 2 is a view similar to Figure 1 but showing girdles which are attached to the cable by clamps, Figure 3 is a cross-section on the line 3—3 of Figure 2, and Figure 4 is a view similar to Figures 1 and 2 but illustrating another construction of the girdles or enlargements.

With reference first to Figure 1 A is a conduit of any known type containing an electric cable B which in this example is assumed to be a lead-covered cable. At suitable intervals in the length of the cable girdles or enlargements C are formed preferably more or less spherical as shown. These are moulded, cast or otherwise formed on the lead sheath of the cable and normally support it so that its main portions are clear of the conduit. As shown in Figure 1 the normal centre line of the cable may be somewhat above that of the conduit leaving more space below the cable than above it. The dimensions of the enlarged portions and the intervals between them are preferably such that when the cable sags due to its expansion under continuous maximum load it may just rest upon the floor of the conduit. This sagging position is indicated in chain lines although it will be understood that the drawing is diagrammatic and that in practice there would be a considerably greater length of cable between the two girdles or enlargements.

The girdles or enlargements shown in Figures 2 and 3 are made separate from the cable and its sheathing and are attached to the cable by screws $C^1$ which serve to clamp a cap or yoke $C^2$ forming the upper part of the girdle to the lower portion $C^3$.

In the construction shown in Figure 4 the enlargements are made by thickening the insulation of the cable or by applying round it at the desired intervals suitable material as at $B^1$. These enlargements with the rest of the cable are then covered by the lead sheathing $B^2$.

The size of the girdles, the external shape thereof, the number employed and the material from which they are made, will naturally vary in accordance with the particular cable in use, the nature of the conduit into which it is drawn and the curvature or line which the conduits follow, these girdles in some cases possessing the additional advantage of reducing the friction to which the cable is subjected while it is being drawn in.

The invention is not restricted to cables which are drawn in to conduits but is obviously also applicable to cables which are laid in longitudinally divided conduits to which the upper part or cover is applied after the cable is placed in position.

It is to be appreciated that the particular construction of the girdle or enlargement, the way in which it is incorporated in the cable when integral therewith or built up and applied thereto when in the form of a separate attachment, may be modified within wide limits without departing from this invention.

What I claim as my invention and desire to secure by Letters Patent is:—

1. In an electric system embodying an insulated power cable adapted to carry a definite maximum load for an appreciable time interval, a conduit for encasing the cable, said cable being provided with enlargements so proportioned and spaced in relation to the dimensions of the cable and the predetermined maximum load which it is intended to carry that the cable can sag freely, thus being free from compressive forces, until it has expanded to the extent brought about by continuous maximum load when it just rests upon the floor of the conduit.

2. In an electric system embodying an insulated power cable adapted to carry a definite maximum load for an appreciable time interval, the combination with a conduit, of detachable girdle members therein forming enlargements at intervals in the length of the cable, said members being so proportioned and spaced in relation to the dimensions of the cable and the predetermined maximum load which it is intended to carry that the cable can sag freely, thus being free from compressive forces, until it has expanded to the extent brought about by continuous maximum load when it just rests upon the floor of the conduit.

3. In an electric system embodying an insulated power cable adapted to carry a definite maximum load for an appreciable time interval, the combination with a conduit, of a plurality of girdle members adapted to embrace the cable at intervals in the length thereof, and means for clamping said members in position on the cable, such members being so proportioned and spaced in relation to the dimensions of the cable and the predetermined maximum load which it is intended to carry that the cable can sag freely, thus being free from compressive forces, until it has expanded to the extent brought about by continuous maximum load when it just rests upon the floor of the conduit.

In testimony whereof I have signed my name to this specification.

PHILIP VASSAR HUNTER.